United States Patent
Flesch

(10) Patent No.: US 9,890,831 B1
(45) Date of Patent: Feb. 13, 2018

(54) SHACKLE SAFETY PIN

(71) Applicant: Joshua John Flesch, Hixson, TN (US)

(72) Inventor: Joshua John Flesch, Hixson, TN (US)

( * ) Notice: Subject to any disclaimer, the term of this patent is extended or adjusted under 35 U.S.C. 154(b) by 0 days.

(21) Appl. No.: 15/421,305

(22) Filed: Jan. 31, 2017

(51) Int. Cl.
*F16G 15/04* (2006.01)
*F16G 15/06* (2006.01)
*E02F 3/36* (2006.01)
*E02F 9/22* (2006.01)
*F16G 13/00* (2006.01)

(52) U.S. Cl.
CPC ........... *F16G 15/06* (2013.01); *E02F 3/3654* (2013.01); *E02F 9/2275* (2013.01); *F16G 13/00* (2013.01); *F16G 15/04* (2013.01)

(58) Field of Classification Search
CPC .......... F16G 15/06; F16G 13/00; F16G 15/04; E02F 9/2275; E02F 3/3654
USPC ............................................................ 59/86
See application file for complete search history.

(56) References Cited

U.S. PATENT DOCUMENTS

| | | | | |
|---|---|---|---|---|
| 1,273,689 A * | 7/1918 | Thomas | ................. | F16G 15/06 278/96 |
| 1,392,138 A * | 9/1921 | Freeman | ................. | B62C 11/02 278/96 |
| 1,751,309 A * | 3/1930 | De Mone | ................. | B66C 1/12 24/115 R |
| 3,270,494 A * | 9/1966 | Holmes | ................. | B63B 21/08 114/108 |
| 5,460,418 A * | 10/1995 | Falls | ................. | F16G 15/06 292/329 |
| 6,023,927 A * | 2/2000 | Epstein | ................. | F16G 15/06 59/85 |
| 9,212,470 B2 * | 12/2015 | Amundson | ........... | E02F 3/3654 |

\* cited by examiner

*Primary Examiner* — David B Jones
(74) *Attorney, Agent, or Firm* — Fred Lane Martin

(57) ABSTRACT

The methods, systems, and the safety shackle apparatus of this invention provide safety, convenience, and reliability needed for shackle applications providing flexible use (fits multiple size shackles and multiple brands of shackles), stores in shackle pin when not in use, saves time vs traditional moussing techniques, difficult to be installed incorrectly, no tools required, no loose parts or pieces, prevents injury from pokes of sharp wire when moussing, prevents sling damage and chaffing from moussing wire ends, no single use consumables like rope, wire or zip ties (reusable), turns anchor and screw pin shackles into safety shackles, using the device doesn't change rigging practices or techniques, works with old or new shackles, works with bow shackle, anchor shackle, chain shackle, twist shackle, head board shackle, C-D-U shaped shackles, can be used in zero visibility, saves attachment and detachment time over a traditional method, system, or apparatus.

1 Claim, 5 Drawing Sheets

SHACKLE SAFETY PIN

CROSS REFERENCE TO RELATED APPLICATIONS

The present application claims the filing benefits of U.S. provisional application Ser. No. 62/421,799 filed Nov. 14, 2016, which is hereby incorporated herein by reference in its entirety. The "lynch pin and a loop" reference of the provisional application generally relates to the shackle safety apparatus reference herein. However, the constituent parts of the shackle safety apparatus herein are not limited solely to the sizes, shapes, materials, uses, or methods of use of lynch pins regarding the incorporation of a "loop." Furthermore, the "loop" reference of the provisional application generally relates to the shackle safety apparatus wire loop reference herein. However, the incorporation or attachment or termination of the safety shackle wire loop herein is not limited to that of welding a "loop" to a pre-manufactured lynch pin.

TECHNICAL FIELD

This invention generally relates to clevises or shackles with retention of shackle or clevis pins as a primary concern based on safety and reliability. It is sufficient in reference to a clevis or shackle as a "shackle." There are various ways in which shackles are constructed, shaped, sized, and used. The uses of shackles include interconnecting cables connected to various loads and pulling power sources and include operations such as pulling, towing, lifting, or securing equipment. Wire cables, rope, slings, straps, rings, eyelets, loops, straps, chains, anchor points, etc. are referred to herein as "load members."

BACKGROUND OF THE INVENTION

A shackle is a metal link, typically U-shaped or D-shaped, closed by a bolt or pin (threaded preferably with regard to the invention) referred to as a clevis or shackle pin. A clevis is a type of shackle but is used equivalent to the shackle herein. A clevis or shackle pin is used to fully enclose the shackle or clevis providing an attachment means between combinations of load members.

Bow shackles and anchor shackles are terms that are often used interchangeably, as both names refer to a shackle with a larger, rounded "O" shape look. However, a bow shackle typically has a larger, more defined bow area than an anchor shackle. The rounded design of anchor shackles and bow shackles allow them to take loads from many directions without developing significant side load. The larger loop shape of an anchor shackle or bow shackle does reduce its overall strength, but it is also able to handle a larger strap Chain shackles are also known as D-shackles. Both refer to the "D" shape design. A d-shackle is narrower than a bow or anchor shackle and generally have a threaded pin or pin close. The smaller loop is designed to take high loads primarily in line. Side and racking loads may twist or bend a D or chain shackle.

Governmental safety organizations state not to use screw pin shackles or fit pins in contact with moving parts if the pin can roll and unscrew. OSHA 1918.62(i)(2) states "Screw pin shackles provided by the employer and used aloft, except in cargo hook assemblies, shall have their pins positively secured." If the load shifts, the sling will unscrew the shackle pin. Also governmental safety organizations such as OSH of Canada state not to use round pin shackles restrained only by a cotter pin for overhead lifting.

A shackle is a device used for fastening. Many shackles are U, D, or C shaped, but the shackles may come in various other shapes. Screw pin type shackles are the most commonly used shackle. Screw pin type shackles generally have two opposing sides that are joined together by an arch shaped piece which forms the U, D, or C shape. One side of the shackle has a threaded hole (hereinafter the threaded side of the screw pin type shackle) and one side is not threaded (hereinafter the non-threaded side of the screw pin type shackle). The shackle pin has one end that is threaded (hereinafter the threaded end of the shackle pin) and one end that has a head (hereinafter the shackle pin head). The shackle pin head may include an aperture. The threaded end of the shackle pin passes through the non-threaded side of the shackle and then threads into the opposing threaded side of the shackle to secure the shackle pin in place.

Screw pin type shackles are commonly used in industrial applications for lifting and rigging. Screw pin type shackles are also commonly found in sailing. A major concern when using screw pin type shackles is the possible disengagement of the shackle pin from the threaded side of the screw pin type shackle while lifting. If the shackle pin were to disengage, serious damage, injury, or even death may result. When using a screw pin type shackle, a common practice to prevent the shackle pin from disengaging is to mouse the shackle. Mousing is a technique that uses wire, rope, or other materials such as zip ties. Such materials are inserted through the aperture in the shackle pin head while the shackle pin is engaged and passed around the non-threaded side of the shackle and back to itself thus preventing the shackle pin from being able to roll. Problems with this mousing technique include but are not limited to, the use of non-reusable materials, the necessity of other tools for installation, the requirement of knowledge of proper technique to effectively secure the shackle pin, the potential damage to personnel and/or rigging that may result, the difficulty of performing without good visibility, and the time consuming nature of the technique.

What has been needed for shackles is a method, system, and apparatus with attributes included, but not limited to; ease of use, applicable to screw pin and anchor type shackles (most common shackle type), flexible use (fits multiple size shackles and multiple brands of shackles), stores in shackle pin when not in use, saves time vs traditional moussing techniques, difficult to be installed incorrectly, no tools required, no loose parts or pieces, prevents injury from pokes of sharp wire when moussing, prevents sling damage and chaffing from moussing wire ends, no single use consumables like rope, wire or zip ties (reusable), turns anchor and screw pin shackles into safety shackles, using the device doesn't change rigging practices or techniques, works with old or new shackles, works with bow shackle, anchor shackle, chain shackle, twist shackle, head board shackle, C-D-U shaped shackles, can be used in zero visibility, saves attachment and detachment time over a traditional method, system, or apparatus.

BRIEF DESCRIPTION OF THE INVENTION

Some or all of the above insights, needs, problems, and limitations may be addressed by the invention as summarized as follows:

A shackle safety apparatus of this invention includes a rod or pin with a metal ring rotatively attached to a proximal end of the rod or pin along with an adjacent safety shackle wire loop termination and a method of attaching the shackle safety apparatus to a shackle.

An intended use of the shackle safety apparatus is to install to a shackle and transform the shackle into a safety shackle to protect users from direct injury, loading and operational accidents causing indirect injury, and from loading and operational accidents causing equipment and property damage.

The purpose of the ring is to provide a spring action and a holding force when rotated until the non-attached side of the ring contacts the rod or pin. The purpose of the wire loop attached to the rod or pin near the ring is to encircle a shackle crown or bell by placing either side of the shackle jaw through the wire loop so that he wire loop can encircle the shackle and become entrapped whenever the shackle becomes fully assembled.

The method of installing safety shackle apparatus comprises placing the wire loop around the non-threaded side of the screw pin type shackle while the shackle pin is disengaged. After the shackle pin has passed though the non-threaded side of the shackle jaw and engaged by screwing the shackle pin into the opposing threaded lug side of the screw pin type shackle, the distal end of the rod or pin of the safety shackle apparatus transcends the aperture in the shackle pin head or flange. The ring of the safety shackle apparatus is closed by a spring like rotating action. The safety shackle apparatus is engaged when the ring is closed and is in contact with the rod or pin and encompasses the shackle pin head or flange. When installed, the safety shackle apparatus prevents the shackle pin from being able to disengage or unscrew by providing tension on the wire loop during an inadvertent rotation of the shackle pin.

BRIEF DESCRIPTION OF THE DRAWINGS

The foregoing, and other aspects, and embodiments will be better understood from the following detailed description of the exemplary embodiments of the invention with reference to the drawings, in which.

DETAILED DESCRIPTION

Example embodiments of the invention now will be described more fully hereinafter with reference to the accompanying and incorporated by reference (cross-referenced) drawings, in which embodiments of the invention are shown. This invention may, however, be embodied in many different step sequences, forms, structures, or materials and should not be construed as limited to the embodiments set forth herein. Rather, these embodiments are provided so that this disclosure will be thorough and complete, and will fully convey the scope of the invention to those skilled in the art.

Like identified numbers refer to like elements throughout. Any use of asterisks herein is indicative of multiplication operations unless otherwise noted.

It should be noted that, as used in the specification and the appended claims, the singular forms "a" and "the" include plural referents, unless the context clearly dictates otherwise.

Figure 1A:
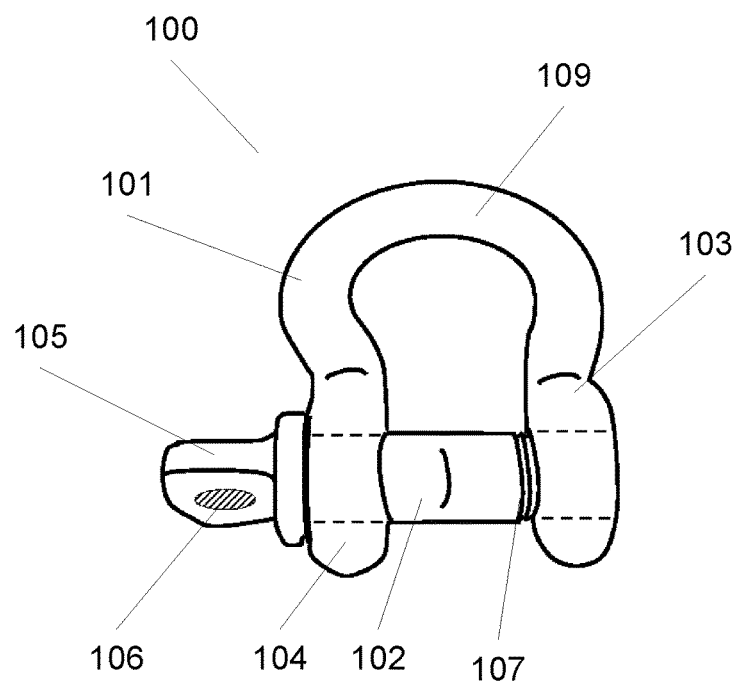
FIG. 1A is as pictorial view of a typical shackle without a safety shackle apparatus attached and with no load terminations contained by the shackle.

With reference to FIG. 1A, the shackle 100 shown is that of a typical shackle without a safety shackle apparatus of any load members such as ropes or cables. The shackle shown is that of a bow or anchor shackle. Other shackles such as "D" or chain shackles have the same basic parts with the body shape differing from the anchor or bow shackles. The differences between shackle types do not limit or reduce the need or use of a safety shackle apparatus in combination with any shackle for safety and other reasons.

With continuing reference to FIG. 1A, a shackle 100 shown includes a shackle body 101, a non-threaded shackle end 104, a threaded shackle lug side 103, a shackle pin 102, a shackle crown section 109, a shackle pin flange 105, a shackle pin flange aperture of hole 106, and shackle pin male threads 107 engaged with the shackle lug 103 female threads not shown.

Figure 1B:
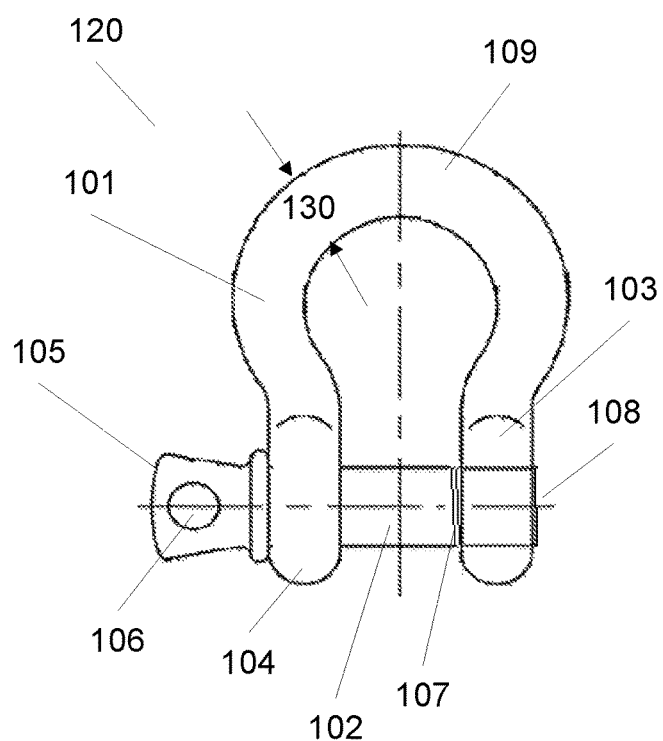
FIG. 1B is a line drawing or face view of a typical shackle with further identifying the features and parts of the shackle without a safety shackle apparatus attached and with no load terminations contained by the shackle.

With reference to FIG. 1B, a shackle 120 drawn is that of a typical shackle without a safety shackle apparatus of any load members such as ropes or cables. The shackle 100 shown includes a shackle body 101, a non-threaded shackle end 104, a threaded shackle lug side 103, a shackle pin 102, a shackle crown section 109, a shackle pin flange 105, a shackle pin flange aperture of hole 106, and shackle pin male threads 107 engaged with the shackle lug 103 female threads not shown and ending at location 108. The diameter of the shackle body 130 is also indicated. This diameter is used as a reference dimension herein with respect to a wire loop length of an associated safety shackle apparatus.

Figure 2A:
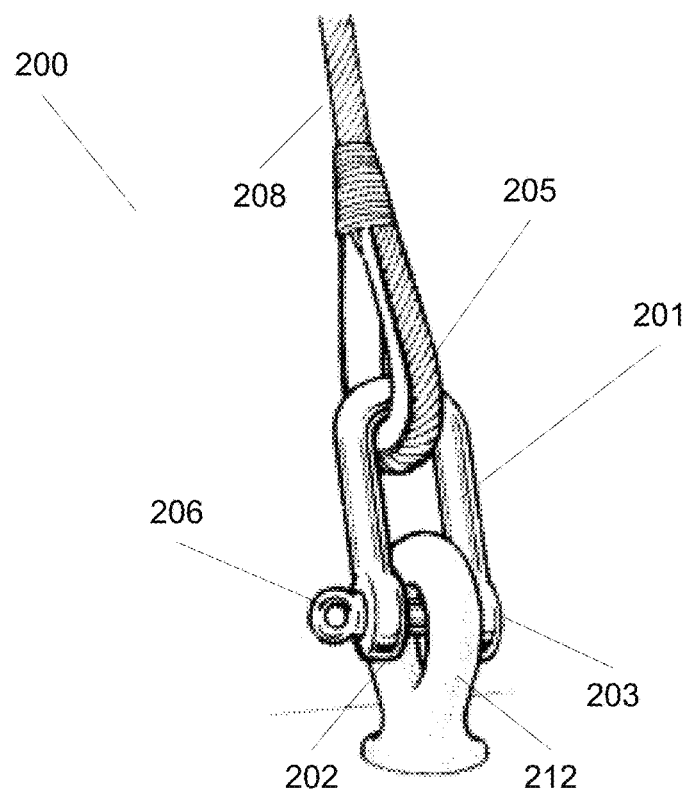
FIG. 2A is a perspective view of a shackle application involving a deck or bulkhead ring and a load or mooring cable.

With reference to FIG. 2A, an exemplary shackle system 200 is shown wherein a shackle 201 is shown interconnecting a deck or bulkhead eyelet 212 and a load cable 208 loop 205. The shackle system 200 does not include a safety shackle apparatus installed at shackle flange aperture 206. In this exemplary shackle system 200 the shackle pin 202 can rotate based on vibration and pivoting of the shackle 201 leading to an undesired and unsafe detachment of the shackle pin 202 at shackle lug 203.

Figure 2B:
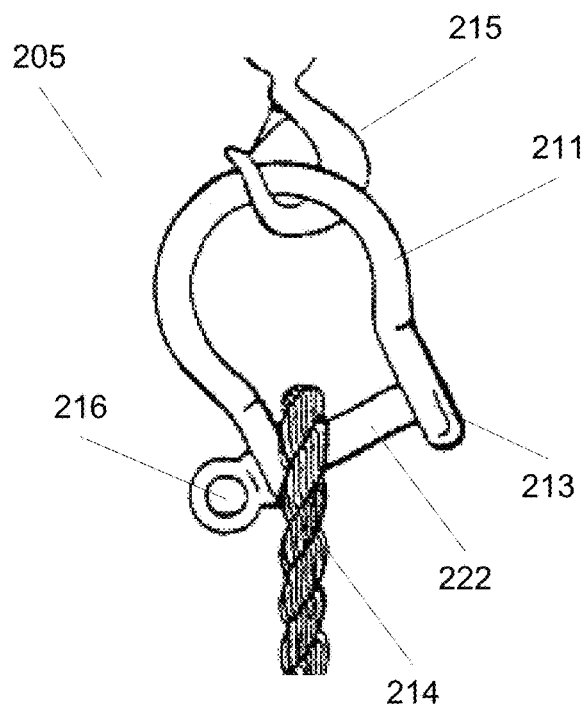
FIG. 2B is an orthographic view of a shackle application involving pulling hook and a rope or cable load member.

With reference to FIG. 2B, an exemplary shackle system 205 is shown wherein a shackle 211 is shown interconnecting a rope or cable 214 and a hook 215. The shackle system 205 does not include a safety shackle apparatus installed at shackle flange aperture 216. In this exemplary shackle system 205 the shackle pin 222 can rotate based on vibration and pivoting of the shackle 201 or from rope or cable 214 movements leading to an undesired and unsafe detachment of the shackle pin 212 at shackle lug 213.

The use of a shackle without a safety shackle apparatus is hereby shown to be unsafe. The invention now is introduced to eliminate the safety issues and provide several important additional features and capabilities.

Figure 3A:
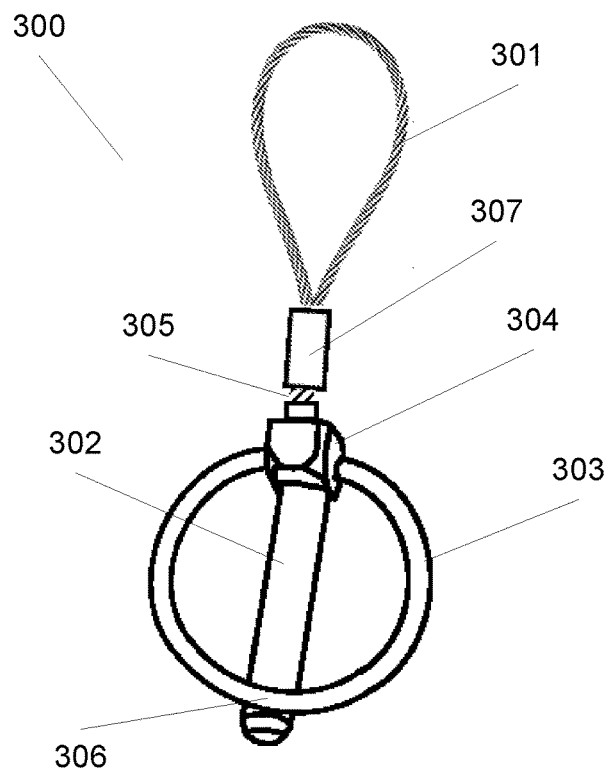
FIG. 3A is an orthogonal view of a safety shackle apparatus with the retaining ring or clip in a rotated locking position without a shackle flange involved.

With reference to FIG. 3A, a safety shackle apparatus 300 is shown including a wire loop 301, a permanent wire loop completion attachment 307, a permanent proximal wire loop termination 305 terminating of one or more loop wire extended from 307, a metal rod or pin 302, a ring adapter 304 at the proximal end of the rod or pin 302, and a ring 303 rotatively attached to the proximal ring adapter 304. The permanent wire loop attachment 307 may be that of a crimp, weld, or bond. One or more of the extended end of wire loop 301 is terminated at the proximal ring adapter whereby the wire loop extended end is bonded, soldered, or welded. The rotatively attached ring 303 is shown in an engaged position 306 in contact with the distal end of the rod or pin 302.

Figure 3B:
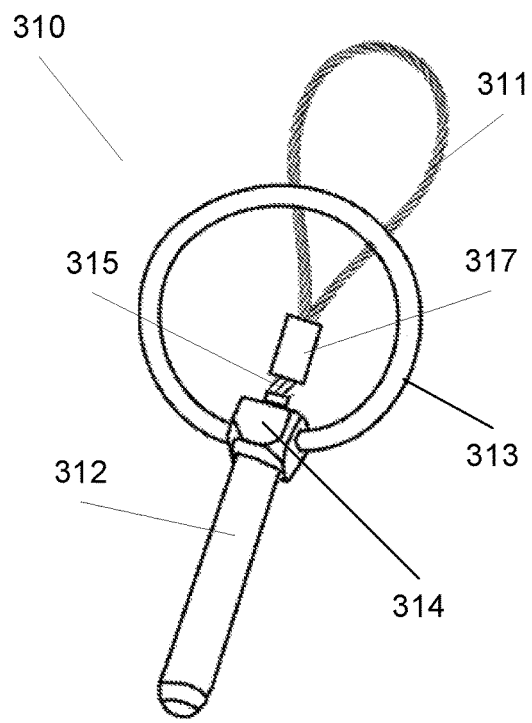
FIG. 3B is an orthogonal view of a safety shackle apparatus with the retaining ring or clip in an unlocked or ready to install position.

With reference to FIG. 3B, a safety shackle apparatus 310 is shown including a wire loop 311, a wire loop attachment 317, a proximal wire loop termination 315, a metal rod or pin 312, a ring adapter 314 at the proximal end of the rod or pin 312, and a ring 313 rotatively attached to the proximal ring adapter 314. The continuous wire loop 311 shown behind the ring 313 is terminated at the proximal ring adapter whereby the wire loop end is bonded, soldered, or welded.

The wire loop size is fixated by a clamp, clip, bond, or other similar device with regard to attachment 317 as in FIG. 3B. The preferred length of wire used to produce a given wire loop 311 size is determined by taking the shackle diameter 130 or "d" as in FIG. 1B and multiplying that diameter by 8, (8*d), to calculate the preferred length and fixating the wire loop size for that length by attachment 317. The preferred length is approximately the length limit for the safety shackle apparatus wire loop construction. Different approximate wire length limits are calculated based on the 8 to 1 ratio of wire length to shackle body diameter 130 as in FIG. 1B.

The distance between attachment 317 and the proximal ring adapter 314 is limited to no more than 10 mm.

Figure 4A:
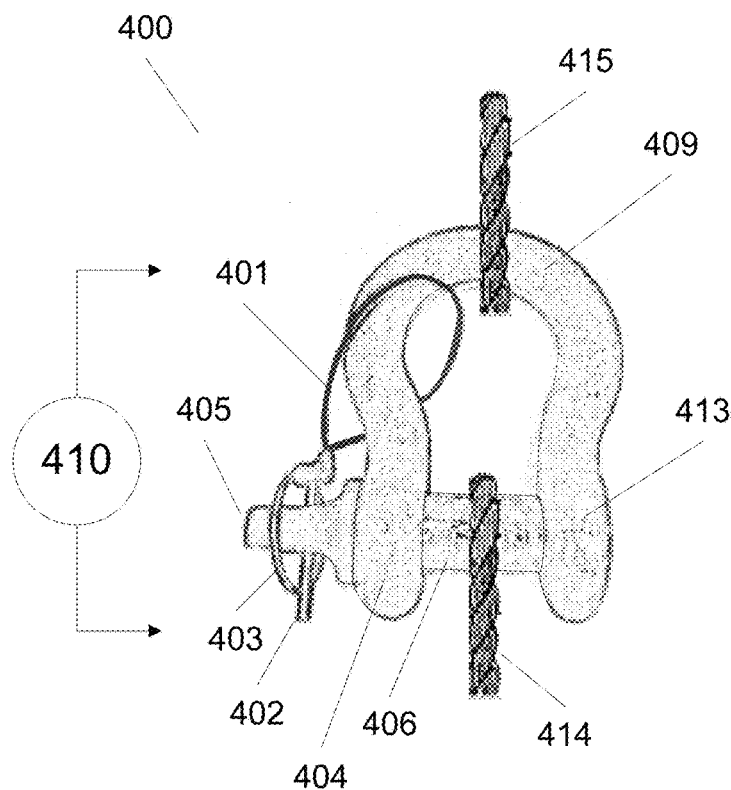
FIG. 4A is a perspective view of a safety shackle including an installed safety shackle apparatus and load members.

With reference to FIG. 4A, an exemplary safety shackle system 400 is shown wherein the safety shackle apparatus installation is completed including load members 414 and 415 as shown as the safety shackle apparatus is installed. The safety shackle assembly includes the wire loop 401 encircling the shackle body 409 along with load member 415 followed by introducing the shackle pin through a clearance hole in shackle end 404 then screwing the threaded distal end of the shackle pin into the shackle lug 413 to the exhaustion of the mated threads. The final steps to assembling the safety shackle takes place at the shackle flange 405 whereby the rod or pin 402 extends through the flange 405 and the rotatively attached ring is rotated into the engaged position encompassing the flange 405. In this exemplary safety shackle system 400 the shackle pin 406 cannot rotate beyond a safe limit due to vibration or pivoting of the shackle or from rope or cable 414 thus preventing an undesired and unsafe detachment of the shackle pin 406 at shackle lug 213.

The shackle safety system 400 wherein the shackle safety apparatus can be quickly and easily installed without tools with approximately three installation steps. The shackle safety system 400 wherein the shackle safety apparatus can be installed with captured and encircled retention of the shackle safety apparatus wire loop to the shackle body. The shackle safety system 400 wherein the shackle safety apparatus requires no additional parts to secure the shackle against unsafe shackle pin detachment. The shackle safety system 400 wherein the shackle safety apparatus can be installed and uninstalled without tools. The shackle safety system 400 wherein the shackle safety apparatus can be installed and retained by the shackle as a safety shackle.

Figure 4B:
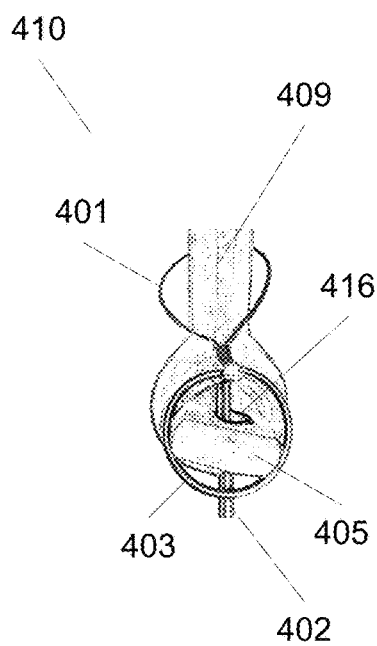
FIG. 4B is a partial exploded view of a safety shackle with the safety shackle apparatus attached at the shackle flange and with a wire loop encircling the shackle body.

With reference to FIG. 4B, the flange side view 410 of FIG. 4A is shown. The wire loop 401 of the safety shackle apparatus is shown encircling the shackle body 409. Also shown in view 410 is the inserted rod or pin 402 extended through the flange hole 416 with the ring 403 rotated into the engaged position in contact with the distal end of the rod or pin 402. Also shown with regard to the engaged position of the ring is attendant with the flange 405 encompassed by the ring 403.

Figure 5:
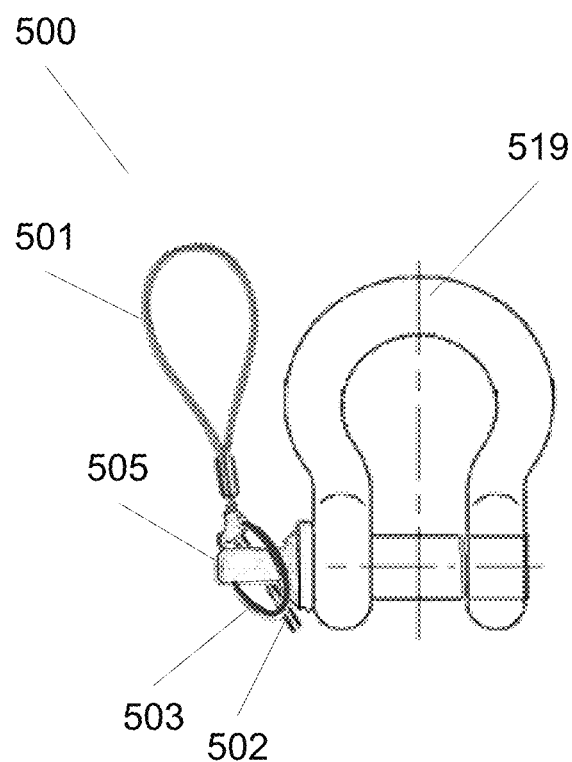
FIG. 5 is a perspective view of a safety shackle apparatus partially attached to a shackle in a storage configuration.

With reference to FIG. 5, a configuration of a partially assembled shackle and safety shackle apparatus 500 is shown which is useful for pairing, storage, and ease of use later. The inserted rod or pin 502 is shown extended through the flange 505 with the ring 503 rotated into the engaged position in contact with the distal end of the rod or pin 502. Also shown with regard to the engaged position of the ring 503 is attendant with the flange 505 encompassed by the ring 503. This configuration 500 with the wire loop outside of the shackle 519 is easily assembled and pairs the shackle 519 with a safety shackle apparatus. Alternatively, the wire loop 501 can be assembled inside the shackle encircling the shackle body 519 for pairing and storage.

The shackle configuration 500 is configured wherein the safety shackle is storable as a unit without the possibility of lost parts when not in use. Alternately, the shackle configuration 400 of FIG. 4A can be configured without the load members 414 and 415 as a paired and storable unit without the possibility of lost parts when not in use.

A method of making a shackle safety apparatus 300 or 310 of FIG. 3B including; determining the size of a selected shackle to be used, sizing a holding pin 312 comprised of an elongated cylindrical body to fit the selected shackle having a proximal location 314 wherein permanent attachments are made and a distal location for extending through a shackle screw pin flange hole during installation, rotatively attaching a rigid metal ring 313 to the proximal location 314 of the pin and producing a spring action when rotated keeping the non-attached end of the ring held in a position short of the distal end of the holding pin and sized to rest beyond the shackle screw pin flange for capturing the shackle screw pin by the rigid metal ring during installation, and attaching a flexible wire loop 311 with ends permanently attached at clip 317 and terminated at 315 to the proximal end of the holding pin and the wire loop sized for forming a loop encircling around and capturing the shackle preventing the shackle pin from rotating beyond a slack limitation in the shackle encircling wire loop after installation.

A method of making and using a shackle system as shown in FIG. 4A; starting with an open shackle (not shown) and placing the shackle safety apparatus wire loop 401 into the open shackle through the shackle jaw between side 404 and lug side 413 and encircling the shackle body 409, placing load terminations through the open shackle jaw into the shackle along with the safety shackle wire loop 401, enclosing the shackle by placing a distally threaded shackle pin 406 into the shackle jaw first through the unthreaded hole of the shackle jaw 404 and extending to the threaded side 413 of the shackle jaw wherein the threaded shackle pin 406 is rotated into position to the approximate exhaustion of the distal threads of the shackle pin 406 and the threaded jaw 413 of the shackle, inserting the distal end of the shackle safety apparatus holding pin 402 into and transcending through the flange 405 of the rotatively positioned shackle pin, and rotating the safety apparatus rigid metal ring 403 until the unattached side of the ring comes into contact with the holding pin 402 at a location encompassing the shackle flange 405 wherein the rigid metal ring 403 retains a holding force on the holding pin 402.

The slack limitation is controlled by the wire loop 401 size whereby the installed shackle safety apparatus cannot rotate relative to the shackle body 409 more than 180 degrees in either rotational clockwise or counter clockwise. The slack limitation limit based on an 8 to 1 ratio ratio of wire length to shackle body diameter 130 as in FIG. 1B also assures that the threaded shackle pin 406 cannot rotate more than 180 degrees in either rotational clockwise or counter clockwise. Since the threaded shackle pin 406 is installed with multiple rotations at the threaded jaw 413 of the shackle prior to the shackle safety apparatus installation step at the shackle flange 405, the slack limitation assures that the multiplicity of rotations applied to the installed shackle pin 406 cannot be substantially unthreaded.

A method of making a paired shackle and safety shackle apparatus without load connections 500 as in FIG. 5 wherein the shackle safety apparatus is partially assembled for storing and later use or alternatively fully assembled (not shown in FIG. 5 with wire loop 501 encircling the shackle body 519, transforming the shackle into a ready to use safety shackle in a secured configuration paired for storing and later use.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A shackle safety system comprising:
   A safety shackle apparatus further comprising:
   a holding pin, comprising:
   a proximal end for a plurality of attachments,
   a proximal rigid metal ring adapter,
   an elongated cylindrical body, comprising a metal rod,
   a rigid metal ring rotatively attached to the proximal rigid metal ring adapter,
   a flexible wire loop further comprising,
   a flexible wire,
   a permanent wire loop completion attachment comprising a crimp, weld, or bond,
   an at least one extended wire end of said flexible wire loop extending through said permanent wire loop completion attachment to the proximal rigid metal ring adapter wherein said extended wire ends are terminated to said ring adapter by one of a bond, solder, or weld; and
   a shackle comprising:
   a shackle body, further comprising:
   any one of a shackle arch, crown, or bell shaped section,
   a shackle body, wherein said shackle body has a diameter,
   a pair of shackle jaw ends wherein,
   a first jaw end comprising an unthreaded shackle jaw end of the shackle body, further comprising a hole,
   a second jaw end comprising a threaded shackle jaw end, further comprising female threads,
   an open shackle jaw between the unthreaded shackle jaw end and the threaded shackle jaw end,
   a shackle pin, said shackle pin further comprising:
   a shackle pin flange, said shackle pin flange comprising a flange hole,
   a plurality of shackle pin male threads located on said shackle pin for threading into the threaded shackle jaw end;
   wherein the shackle safety system comprises an assembled shackle and safety shackle apparatus, said shackle safety system comprising:
   the shackle body with the open shackle jaw encircled by the flexible wire loop by placing either shackle jaw end through the wire loop so that the wire loop can encircle the shackle body,
   the shackle screw pin rotatively positioned wherein the threaded distal end of the shackle screw pin is first extended through the unthreaded hole of the first shackle jaw end and further extended to and rotated with multiple rotations into the threaded second shackle jaw end,
   the distal location of the holding pin extended through the rotatively positioned shackle screw pin flange hole,
   the rigid metal ring rotatively attached to the proximal metal ring adapter wherein the ring is rotated until the ring contacts the holding pin at the distal end of the holding pin extended through and beyond the rotatively positioned shackle screw pin flange hole,
   the assembled shackle and safety shackle apparatus, wherein the rotatively positioned shackle pin cannot rotate more than 180 degrees in either rotational clockwise or counter clockwise direction limited by a slack limitation of the flexible wire loop encircling the shackle body,
   the slack limitation of the flexible wire loop encircling the shackle body is based on an 8 to 1 ratio of wire length to shackle body diameter assuring that the rotatively positioned shackle pin of the assembled shackle and safety shackle apparatus cannot rotate more than 180 degrees in either rotational direction assuring that the multiple rotations of the shackle pin cannot be substantially unthreaded leading to an undesired and unsafe detachment.

* * * * *